(12) United States Patent
Riegger et al.

(10) Patent No.: US 10,344,705 B2
(45) Date of Patent: Jul. 9, 2019

(54) INTAKE VALVE FAIRING FOR A CYLINDER HEAD OF AN ENGINE

(71) Applicant: Ford Global Technologies, LLC, Dearborn, MI (US)

(72) Inventors: John Christopher Riegger, Ann Arbor, MI (US); Jeffrey D. Fluharty, Woodhaven, MI (US); Philip Damian Cierpial, Grosse Pointe Park, MI (US); Abhijyoth Vempati, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 15/296,425

(22) Filed: Oct. 18, 2016

(65) Prior Publication Data

US 2018/0106214 A1 Apr. 19, 2018

(51) Int. Cl.

| F02F 1/42 | (2006.01) |
|---|---|
| F02M 35/104 | (2006.01) |
| F01L 3/08 | (2006.01) |
| B23C 3/16 | (2006.01) |
| F01L 1/14 | (2006.01) |
| F01L 1/053 | (2006.01) |
| F02B 31/00 | (2006.01) |

(52) U.S. Cl.
CPC .............. *F02F 1/4235* (2013.01); *B23C 3/16* (2013.01); *F01L 3/08* (2013.01); *F02M 35/104* (2013.01); *B23C 2215/242* (2013.01); *B23C 2215/60* (2013.01); *F01L 1/14* (2013.01); *F01L 2001/0537* (2013.01); *F01L 2820/042* (2013.01); *F02B 31/00* (2013.01); *F02F 1/4214* (2013.01); *F02F 2200/00* (2013.01)

(58) Field of Classification Search
CPC .... F02F 1/4235; F02F 1/24; F02F 1/42; F02F 1/4242; F02F 1/425; F02F 2001/244; F02F 2001/4207; F02M 35/104; F02M 35/10091

See application file for complete search history.

(56) References Cited

U.S. PATENT DOCUMENTS 3,273,551 A * 9/1966 Julien .................... F02F 1/425
123/188.14
4,159,011 A 6/1979 Sperry
(Continued)

OTHER PUBLICATIONS

Demorro, "In-Depth Look at Chevrolet Performance's LSX Cylinder Heads", LSX Magazine, Aug. 27, 2012, 10 pages.
(Continued)

*Primary Examiner* — Grant Moubry
(74) *Attorney, Agent, or Firm* — Brooks Kushman P.C.; Julia Voutyras

(57) ABSTRACT

An engine has a cylinder head defining an intake port with a roof defining first and second valve guide bores upstream of first and second siamesed intake valve seats for a cylinder. The head has first and second asymmetric fairings extending outwardly from the roof and positioned directly upstream of respective bores. Each fairing has an inner wall intersecting an outer wall along an upstream edge and an inclined planar roof wall extending between the inner and outer walls. A method of forming the cylinder head and engine is also provided by milling the fairings from a roof preform formed with the intake port of the head.

18 Claims, 7 Drawing Sheets

(56) References Cited

U.S. PATENT DOCUMENTS

| | | | | | |
|---|---|---|---|---|---|
| 4,481,915 | A | * | 11/1984 | Nakanishi | F02B 31/082 123/188.14 |
| 4,499,868 | A | * | 2/1985 | Kanda | F02B 31/082 123/188.14 |
| 4,606,308 | A | * | 8/1986 | Furlong | F02F 1/4228 123/188.14 |
| 4,748,950 | A | * | 6/1988 | Okumura | F02B 31/085 123/308 |
| 4,838,219 | A | | 6/1989 | Feuling | |
| 4,976,231 | A | | 12/1990 | Feuling | |
| 5,167,211 | A | * | 12/1992 | Fukuma | F02B 31/04 123/308 |
| 5,662,079 | A | * | 9/1997 | Snider | F02B 29/00 123/188.14 |
| 5,873,341 | A | | 2/1999 | Smith, Jr. et al. | |
| 6,213,090 | B1 | * | 4/2001 | Tamai | F02B 31/085 123/308 |
| 6,378,488 | B1 | * | 4/2002 | Trigui | F02B 23/101 123/193.5 |
| 7,270,109 | B2 | * | 9/2007 | Hara | F02B 23/08 123/188.14 |
| 9,784,209 | B2 | * | 10/2017 | Tosato | F02F 1/425 |
| 2009/0000590 | A1 | * | 1/2009 | Buhr | F02B 17/00 123/193.5 |

OTHER PUBLICATIONS

Vizard, "A Super Head for Small-Block Fords", D3 Head—Tech—Muscle Mustangs and Fast Fords, Sep. 11, 2006, 25 pages.

LS Engine DIY, "LS Race Port Cylinder Heads Guide", Sep. 22, 2015, 25 pages.

\* cited by examiner

INTAKE VALVE FAIRING FOR A CYLINDER HEAD OF AN ENGINE

TECHNICAL FIELD

Various embodiments relate to a fairing associated with an intake valve in a cylinder head of an internal combustion engine.

BACKGROUND

Engine intake valves have valve stem guides that protrude from a surrounding roof of an engine intake port. Intake air or intake air have to flow past the guide and associated valve stem as the intake air flows through the port and to the intake valve seat to the cylinder. The intake valve guide may disrupt the flow streamlines, redirect intake air flow from a desired path, or reduce the flow rate of the intake air into the cylinder.

SUMMARY

In an embodiment, an engine is provided with a head defining an intake port with a roof defining first and second valve guide bores upstream of first and second siamesed intake valve seats for a cylinder. The head has first and second fairings extending outwardly from the roof and positioned directly upstream of respective bores. Each fairing has an inner wall intersecting an outer wall along an upstream edge and an inclined planar roof wall extending between the inner and outer walls.

In another embodiment, a cylinder head has a member defining an intake port extending from an intake manifold mounting flange to first and second intake siamesed intake valve ports separated by a valve bridge, a roof of the intake port defining first and second v-shaped fairings upstream of and directly adjacent to first and second valve guide bores. Each fairing has a planar inner wall and a planar outer wall extending outwardly from the adjacent roof surface, with the inner and outer walls intersecting along an upstream edge of the fairing. A length of the outer wall is greater than a length of the inner wall for each fairing, with the inner walls of the first and second fairings facing one another. Each fairing has a downstream guide wall extending outwardly from the adjacent roof surface and extending between the inner and outer side walls. The guide wall is shaped to be concentric with the associated bore. Each fairing has a planar roof wall extending between the inner and outer side walls and the guide wall, with the roof wall inclined towards the upstream edge and inclined towards the inner wall. Each fairing is asymmetric.

In yet another embodiment, a method of forming an engine is provided. An intake port is formed in a cylinder head with a roof preform, with the intake port extending from an intake manifold mounting flange to first and second intake valve seats for a cylinder. The roof preform is milled to form first and second asymmetric valve guide fairings extending outwardly from a surrounding roof of the intake port. Each fairing has inner and outer side walls intersecting along an upstream edge and intersecting a downstream concave guide wall. Each fairing has a roof wall extending between the inner and outer side walls and the guide wall, with a length of each outer side wall being greater than a length of each associated inner side wall. First and second valve guide bores are machined into the roof of the intake port directly downstream of and concentric with respective guide walls of the first and second fairings.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
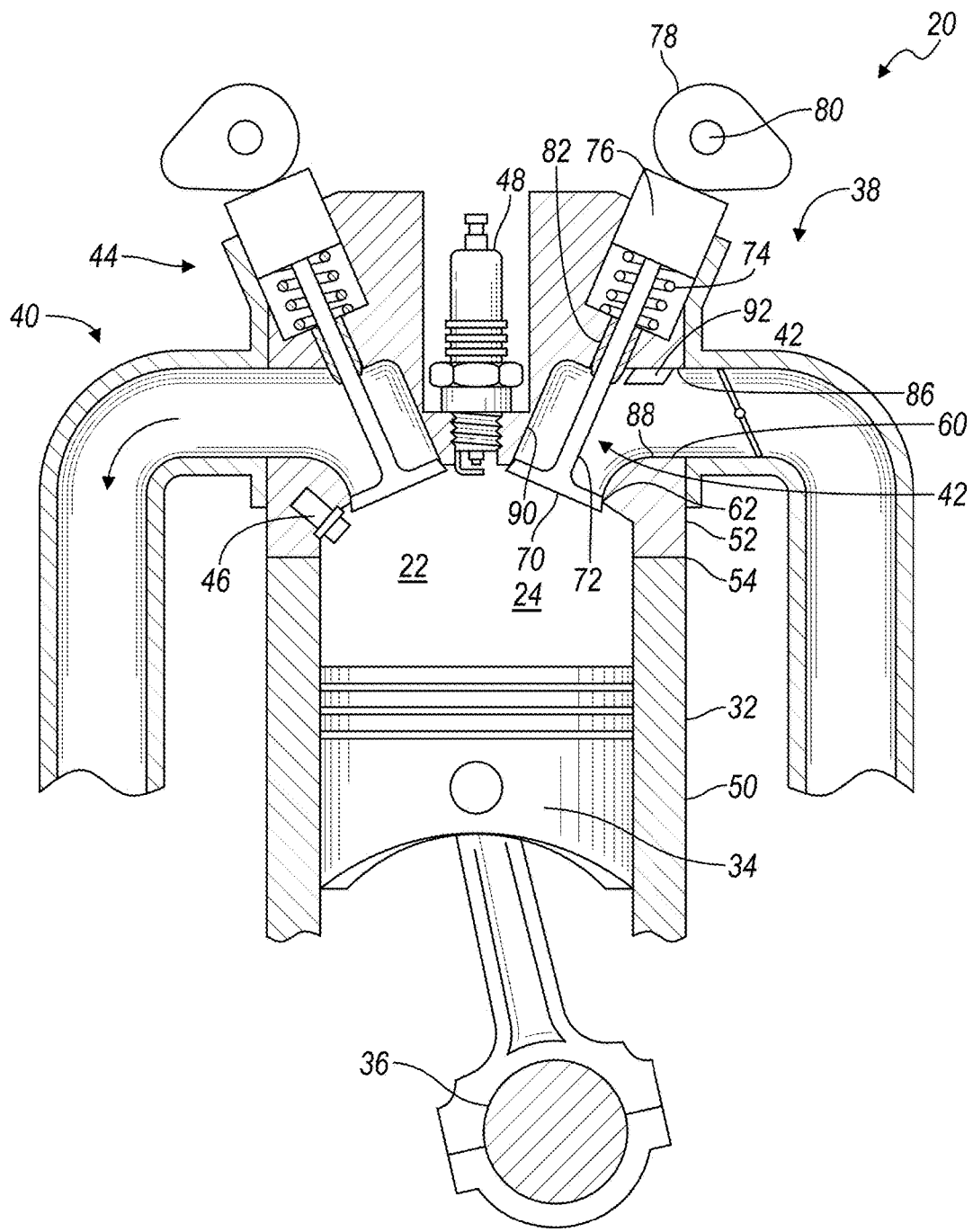
FIG. 1 illustrates a schematic of an internal combustion engine capable of implementing the disclosed embodiments.

FIG. 1 illustrates a schematic of an internal combustion engine 20. The engine 20 has a plurality of cylinders 22, and one cylinder is illustrated. The engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with the intake manifold 38 and the exhaust manifold 40. One or more intake valves 42 controls flow from the intake manifold 38 into the combustion chamber 30. One or more exhaust valves 44 controls flow from the combustion chamber 30 to the exhaust manifold 40. The intake and exhaust valves 42, 44 may be operated in various ways as is known in the art to control the engine operation. The operation of the intake valve 42 is described in greater detail below.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 30. The spark plug 48 may be located in various positions within the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, valve timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. The piston 34 position at the top of the cylinder 22 is generally known as top dead center (TDC). The piston 34 position at the bottom of the cylinder is generally known as bottom dead center (BDC).

During the intake stroke, the intake valve(s) 42 opens and the exhaust valve(s) 44 closes while the piston 34 moves from the top of the cylinder 22 to the bottom of the cylinder 22 to introduce air from the intake manifold to the combustion chamber.

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve(s) 42 remains closed, and the exhaust valve(s) 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valves 42, 44 positions and timing, as well as the fuel injection timing and ignition timing may be varied for the various engine strokes.

The engine 20 has an engine cylinder block 50 and a cylinder head 52. A head gasket 54 is interposed between the cylinder block 50 and the cylinder head 52 to seal the cylinders 22.

The cylinder head 52 defines an intake air port 60. The intake air port 60 provides a passage for flow of intake air or intake gases from the intake manifold 38 to a respective cylinder 22. Intake air may include outside or environmental air, may include fuel mixed therein, and may also be mixed with exhaust gases from an exhaust gas recirculation system, etc. The intake air port 60 has a seat 62. The seat 62 acts as an opening into the combustion chamber 24 that cooperates with the intake valve 44 to seal the port 60 or prevent flow of intake air into the chamber 24 when the intake valve 42 is "seated" against the seat 62.

The engine 20 is illustrated as having the intake valve 42 as a poppet type valve in a direct overhead cam configuration. The engine and intake valve 42 may be configured in various manners as is known in the art, for example, as a single overhead camshaft, dual overhead camshaft, direct camshaft actuation, an overhead valve configuration with the valves operated by pushrods or rockers, and the like. The valve 42 is shown as being mechanically operated by the camshaft; however, in other examples, the valve 42 may be hydraulically or electrically controlled.

The valve 42 has a head 70 that is connected to an end of a valve stem 72. The head 70 may have various shapes, and is sized to mate with the seat 62 when the valve 42 is in a closed position. The head 70 extends radially outwardly from the stem 72.

The stem 72 is actuated by a valve mechanism. In the present example, the valve mechanism includes a spring 74 that biases the head 70 towards an open position with the head 70 unseated from the seat 62 to allow intake air from the intake port 60 into the cylinder 22, and a tappet 76. The tappet 76 has a surface that is in contact with a lobe 78 on a camshaft 80. As the camshaft 80 and lobe 78 rotate, the surface of the lobe 78 interacts with the tappet 76 to depress the tappet 76 and move the valve stem 72 and head 70 to the closed position with the head 70 seated in the valve seat 62. The lobe 78 is shaped and sized to provide the desired valve timing, including the desired lift and duration for the valve 42. In other examples, the valve 42 is controlled to have variable valve timing as is known in the art. The valve mechanism may also include various rockers, pushrods, and the like as are known in the art.

The valve 42 also has a valve guide 82. The guide 82 is a cylindrical sleeve that is provided within the cylinder head that maintains the position of the stem and head of the valve 42. The valve stem 72 extends through the sleeve 82. The guide 82 has an outer wall in contact with and supported by the cylinder head, and an inner wall that surrounds the valve stem 72. Clearance is provided between the inner wall of the guide 82 and the stem 72 such that the stem easily slides within the guide 82. The guide 82 may extend or protrude into the intake port 60. The guide is commonly made from steel or another material that is wear resistant.

The guide 82 is positioned within a bore 84 formed into the roof 86 of the intake port 60. As the guide 82 protrudes into the intake port, along with the valve stem, the flow of intake air may be disrupted by the structure of the guide 82. The guide 82 may be press fit or otherwise affixed within the bore 84.

The roof 86 of the intake port 60 is opposite to a floor 88. A back wall 90 of the intake port 60 extends from the roof 86 to the seat 62.

In the present disclosure, a fairing 92 is positioned upstream of each intake valve guide 82 to redirect intake air around the guide 82 and stem 72 and improve engine 20 operating characteristics and efficiency as described below.

FIGS. 2-6 illustrate various views of fairings 92 in an intake port of a cylinder head of an internal combustion engine, such as engine 20 according to an embodiment. Elements similar to or the same as those described above with respect to FIG. 1 are given the same reference number.

Figure 2:
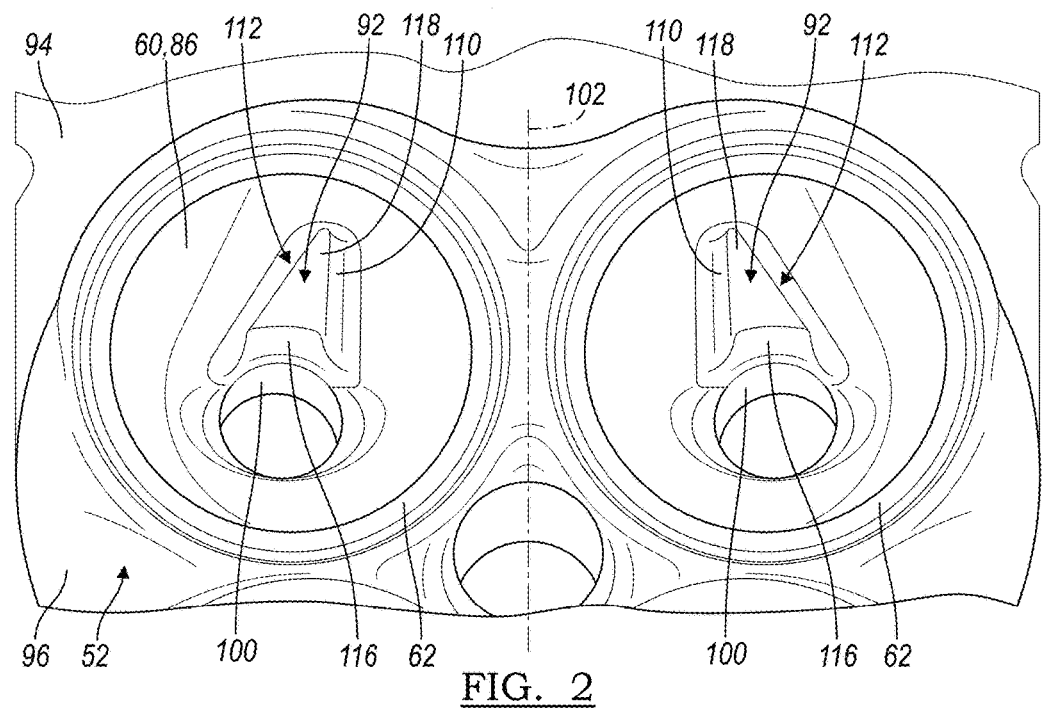
FIG. 2 illustrates a partial perspective view of a cylinder head from the deck face of the cylinder head.
Figure 3:
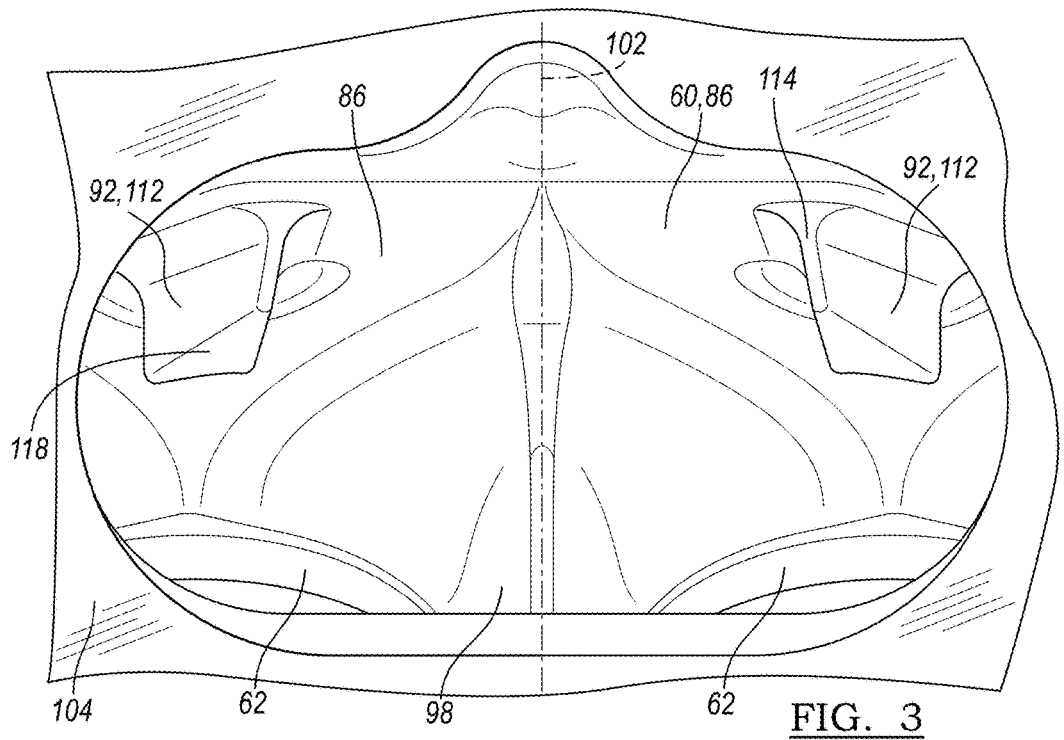
FIG. 3 illustrates a partial perspective view of the cylinder head of FIG. 2 from the intake manifold mounting flange.

FIGS. 2-3 illustrate partial views of the cylinder head 52. In FIG. 2, the deck face 94 of the cylinder head 52 is shown surrounding a roof area 96 for a cylinder 22. The cylinder 22 in the head 52 has first and second intake valve seats 62. The intake valve seats 62 are separated by a bridge region 98. In one example, the intake valve seats 62 are siamesed, as shown in the Figure. FIG. 3 illustrates that the valve bridge 98 may extend into the port 60 to form a flow divider within the port 60 to assist in dividing or separating the intake air into a first stream to the first seat and a second stream to the second seat.

A region of the intake port 60 may be seen through the valve seats 62. The roof 86 of the intake port 60 has first and second valve guide bores 100. Each valve guide bore 100 may be provided as a cylindrical bore within the head 52, and may be machined, bored, or otherwise formed in the head. Each guide bore 100 intersects the roof 86 of an intake port 60 of the engine, and is positioned upstream of and substantially coaxial with a respective valve seat 62.

The intake port 60 has first and second fairings 92. One of the fairings 92 is positioned directly adjacent to and upstream of an associated guide bore 100. Each fairing 92 extends outwardly from the surrounding roof 86 of the intake port and is formed integrally with the cylinder head 52. Each fairing 92 is positioned or formed to be asymmetric. The fairings 92 may be mirror symmetric about a plane 102 extending through the bridge 98 and an intake manifold mounting flange 104 of the head. In other example, the fairings 92 may not be mirror symmetric based on other head and port geometries. In FIG. 3, the mounting flange 104 of the cylinder head is shown and the valve seats 62 are also visible. As such the intake port 60 provides a fluid passage for intake air from the intake manifold mounting flange 104 to the intake valve seats 62 for a single cylinder in the head 52. The roof 86 and the back wall 90 of the intake port 60 are free of fairings or other protruding surface shapes downstream of the valve seat 62.

Referring to FIGS. 2-6, each fairing 92 has an inner side wall 110 and an outer side wall 112. The inner and outer side walls 110, 112 may be generally planar surfaces as shown in FIGS. 2-6. The inner and outer side walls 110, 112 intersect one another along an upstream edge 114, or at a narrow wedged shaped region. The inner walls 110 of the fairings 92 face one another such that they are on the side of the fairing 92 facing the plane 102 and centerline of the intake port 60.

Each of the inner and outer side walls 110, 112 extend outwardly and away from the adjacent roof surface 86 of the intake port 60. The inner and outer side walls 110, 112 of each fairing 92 form an angle $\alpha$ between the surfaces such that the fairing 92 is generally v-shaped. In one example, angle $\alpha$ is an acute angle, with the inner wall within 0-5 degrees of the flow direction or the plane 102, and the outer wall 112 within 10-20 degrees of the flow direction or the plane 102.

Figure 4:
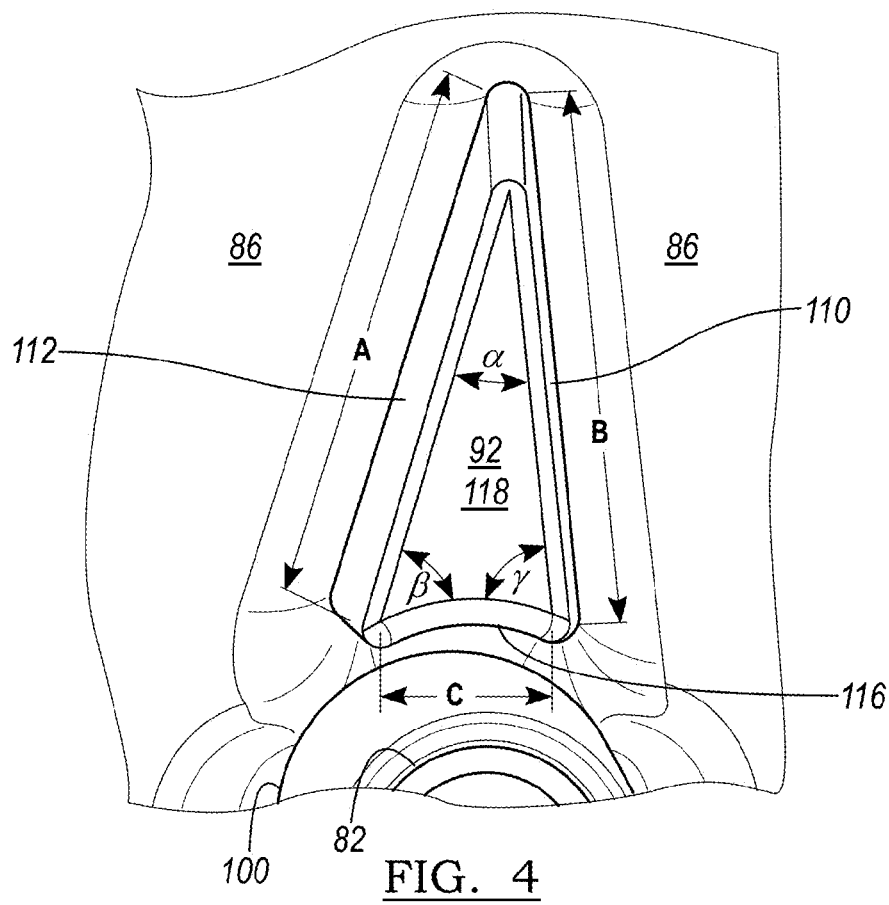
FIG. 4 illustrates a perspective view of a fairing of the cylinder head of FIG. 2.

As shown in FIG. 4, a length of the outer side wall A is greater than a length of the inner side wall B, where the lengths are taken along the intersection of the side wall and the adjacent roof surface 86. In one example, the outer wall 112 is up to 15 percent longer than the inner wall 110, and in an example is 5-10 percent longer, or approximately 6 percent longer in a further example. The difference in lengths of the side walls 110, 112 contributes to the asymmetry of the fairing.

Each fairing 92 has a downstream guide wall 116 that is on the opposite end of the fairing 92 compared to the upstream edge. The guide wall 116 is directly adjacent to and upstream of the adjacent bore 100. The guide wall 116 extends outwardly and away from the adjacent roof surface 86. The guide wall 116 extends between the inner and outer side walls 110, 112 of a fairing 92, such that the fairing 92 has a generally triangular shape as shown. The guide wall 116 is concave and curved. The guide wall 116 is shaped to be concentric with the adjacent bore 100. A radius of curvature of the guide wall 116 is greater than a radius of curvature of the bore 100. A distance C associated with a width of the fairing along the guide wall 116 is less than a diameter of the bore 100. The distance C is also less than the distances A or B associated with the side walls 110, 112.

As can be seen in FIG. 4, the guide wall 116 and the outer side wall 112 form an angle $\beta$ therebetween, and the guide wall 116 and the inner side wall form another angle $\gamma$ therebetween. The angles $\beta$ and $\gamma$ are each acute angles.

Each fairing 92 has a roof wall 118. The roof wall 118 extends between the inner and outer side walls 110, 112 and the guide wall 116. The guide wall 118 may have a planar surface as shown. In other examples, the guide wall 118 may be non-planar, for example, with a curved surface. The roof wall 118 is spaced apart from and is nonintersecting with the adjacent and surrounding roof 86 of the port 60. The roof wall 118 is also nonparallel with the directly adjacent roof 86 of the port.

Figure 5:
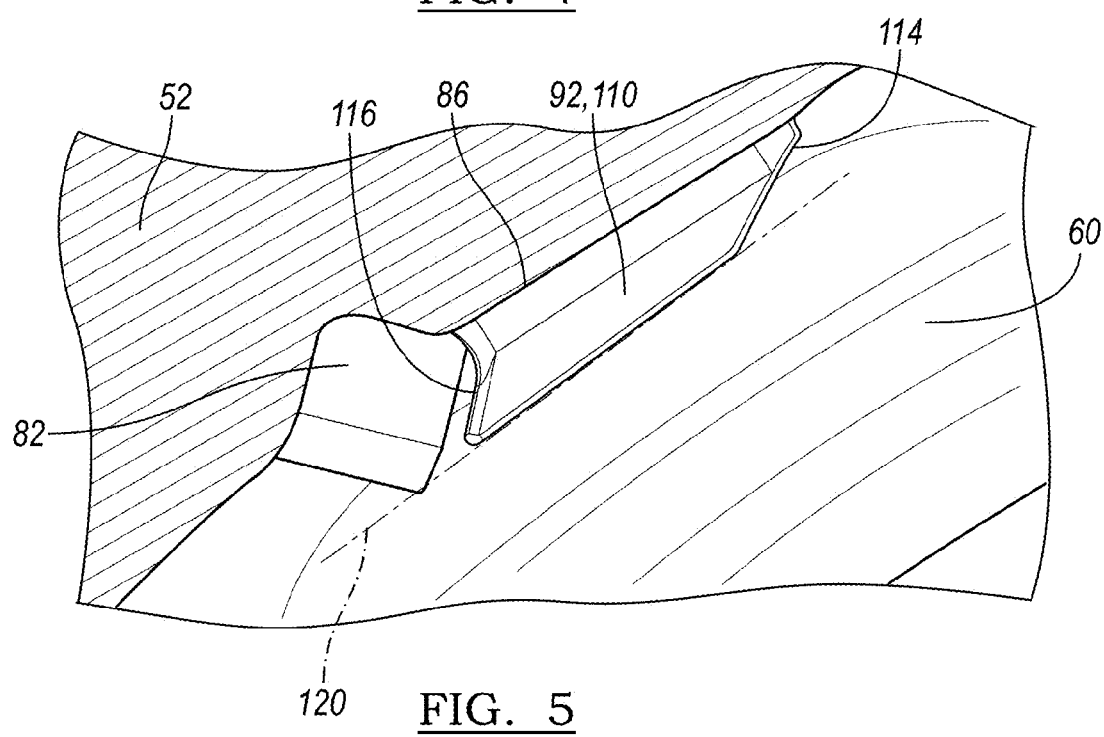
FIG. 5 illustrates a side view of the fairing of FIG. 4.

The roof wall 118 is inclined towards the upstream edge 114 of the fairing 92, as shown in FIG. 5. This corresponds with the height of the inner and outer side walls 110, 112 increasing along the length of each side wall in the downstream direction. In one example, a side wall has a height at an intersection of the upstream edge 114 that is approximately ninety percent of the height of the same side wall at an intersection with the downstream guide wall 116, as is shown for the inner side wall 110 in FIG. 5. The fairing 92 therefore tapers towards the upstream direction and towards the upstream edge 114.

In FIG. 5, the upstream edge 114 is shown to be raked or swept back such that the upstream edge 114 forms an acute angle with the roof wall 86. As such, the upstream region of the roof wall 118 is set back or downstream of the farthest upstream region of the fairing 92. The upstream edge 114 may be raked or swept back 20-40 percent of the length of the fairing 92.

The guide wall 116 in FIG. 5 is also parallel with or substantially parallel with the outer wall of the adjacent valve guide 82. Additionally, as can be seen in the Figure, the guide wall 116 may be swept back as well, which provides a sharper edge transition at the downstream end of the fairing to cause the intake air flow to maintain it flow direction over the adjacent guide 100.

The valve guide 82 is positioned within the valve guide bore 100 to extend to a depth within the intake port 60 such that the distal part of the valve guide 82 reaches a plane 120 containing the roof wall 118. The fairing 92 therefore redirects flow in a controlled manner around the guide 82 and stem 72 without providing more obstruction than necessary in the intake port 60 to maintain cross sectional flow area of the port 60 and maintain port velocities of the intake air.

Figure 6:
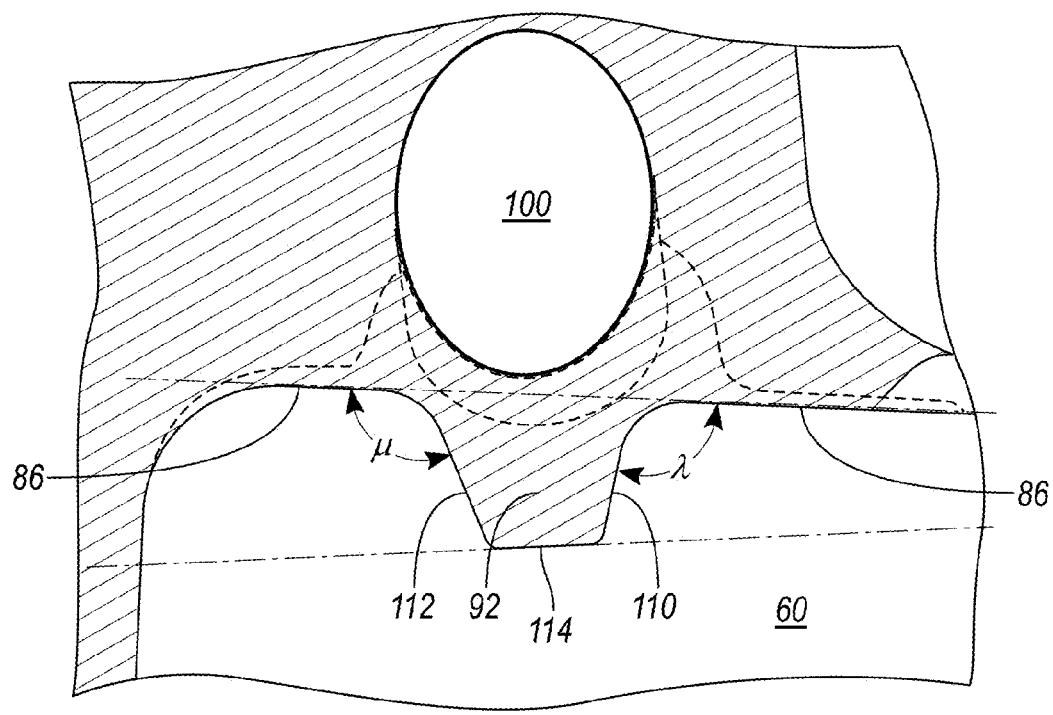
FIG. 6 illustrates a sectional view of the fairing of FIG. 4.

FIG. 6 illustrates a section view of the cylinder head 52. The roof wall 118 is shown as also being inclined towards the inner wall 110 of the fairing 92, such that the roof wall 118 is nonparallel with the adjacent roof surface of the port as shown in the Figure. Therefore, the roof walls 118 of the two fairings are inclined towards one another and towards the plane 102.

The inner and outer walls 110, 112 of each fairing 92 are also oriented at different angles to the surrounding roof surface 86 such that the inner wall 110 is steeper relative to the adjacent roof surface 86 in comparison with the outer wall 112, as shown in FIG. 6. For each fairing 92, the inner wall 110 extends outwardly from the surrounding roof at a first angle $\lambda$, thereto and the outer wall 112 extends outwardly from the surrounding roof at a second angle $\mu$ thereto relative, with the first angle $\lambda$, less than the second angle $\mu$ such that the inner wall 110 is steeper than the outer wall 112. The difference in angles $\lambda$, $\mu$ contributes to the asymmetry of the fairing 92, and acts to steer the flow of intake air approaching the valve guide 82. The outer side wall 112 is less steep compared to the inner side wall 110 to alleviate impingement of intake air that would otherwise cause a restriction in the flow path and in the intake port 60.

Figure 7:
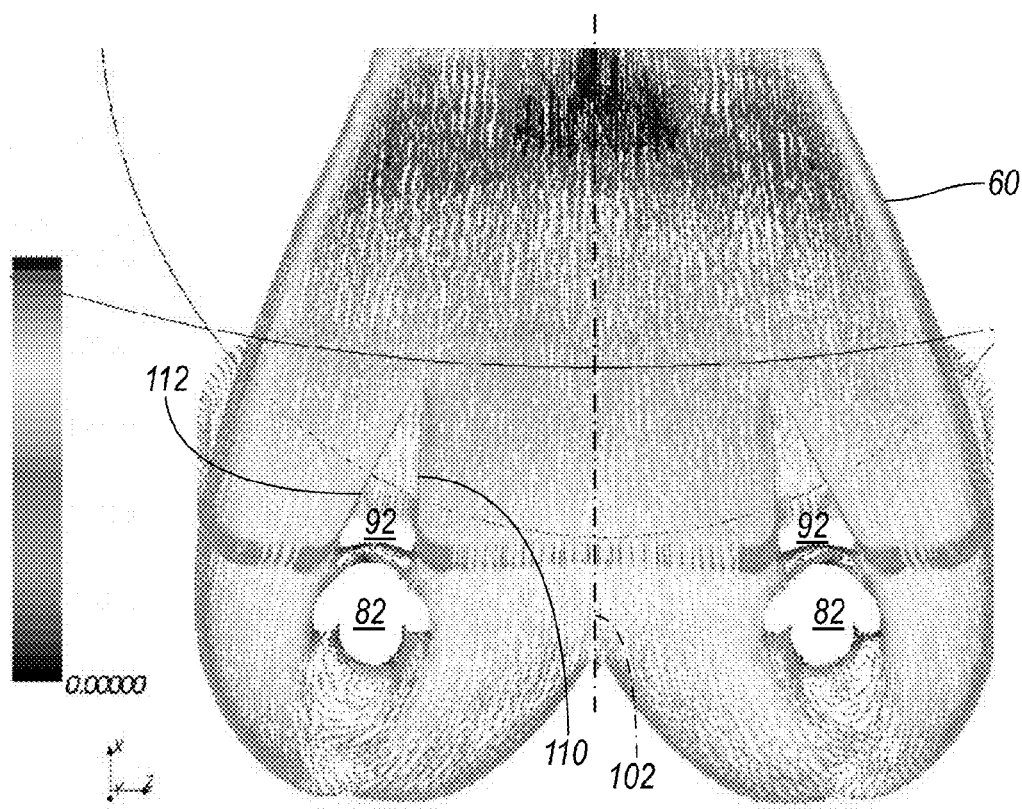
FIG. 7 illustrates modeling results showing fluid streamlines from a computational fluid dynamic model of the intake port of the cylinder head of FIG. 2.

FIG. 7 illustrates results of computational fluid dynamic modeling of the intake port 60 of FIGS. 2-6 and shows the manner in which the fairings 92 redirect flow around the valve guides 82 and valve stems. The various sizes and angles of the walls of the fairing 92 provide a smooth division of flow of intake air by the fairing 92 and past the intake valve guide. The shape of the fairings 92 prevents separation of flow and also minimizes a wake zone downstream of the fairing, especially as the flow rate of the intake air increases at higher degrees of valve lift. The fairings 92 provide for over half a percent increase of standard cubic feet per minute at maximum valve lift.

The angle of the side wall 112 and the angle of the side wall 110 are selected to avoid separation as the flow passes the upstream edge 114 of the fairing 92 and approaches the valve guide 82. As can be seen in FIG. 7, the outer side wall 112 forms a larger angle with the central plane 102, which also corresponds to the incoming flow direction of the intake air, than the angle formed between the inner wall 110 and the plane 102.

The width of the fairing 92 at the downstream end (or along the guide wall 116) was selected such that the flow velocities of the intake air were not less than a target velocity along the length of the fairing 92. The upstream end of the fairing 92 was selected to extend to a specified flow velocity of the intake air within the port. In one example, the length to width aspect ratio of the roof wall 86 of the fairing 92 is between 2.5 to 3.0, and may be approximately 2.75 in a further example.

The distal regions of the fairing 92 away from the roof 86 are formed with a small radius of curvature, for example, on the order of 0.5 mm, to control the separation of the flow about the fairing 92 and to provide more planar wall surface area to control the flow direction of the intake air. The side walls 110, 112 may join with the adjacent roof surface with a larger radius of curvature as to provide for a smooth transition of flow along the roof surface 86 and along the side walls 110, 112.

Figure 8A:
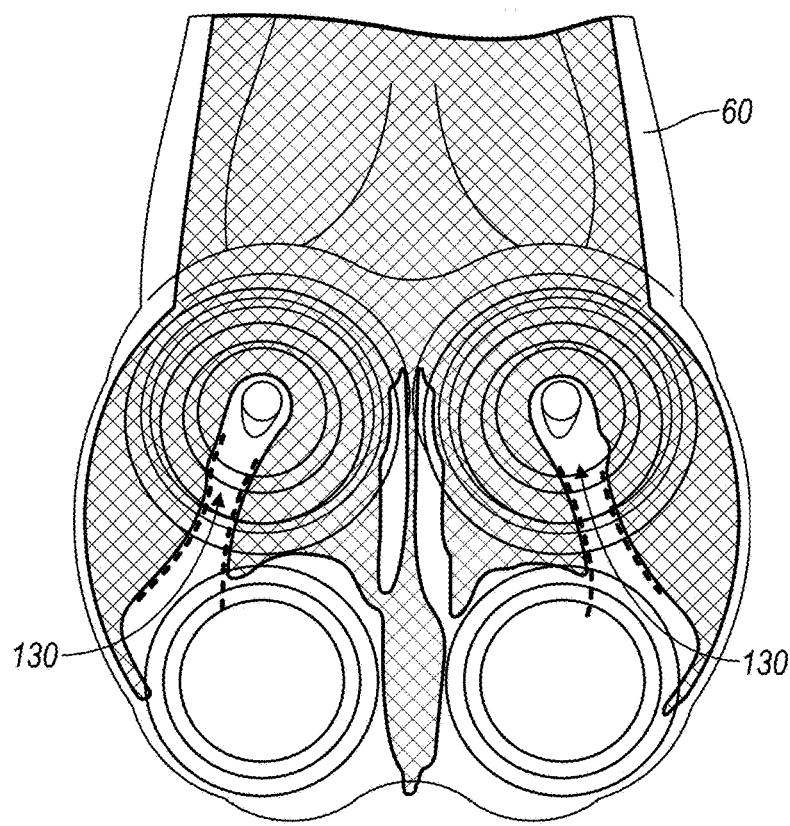
FIG. 8A illustrates modeling results showing constant total pressure from a computational fluid dynamic model of the intake port of the cylinder head of FIG. 2 taken from the deck face of the cylinder head.
Figure 8B:
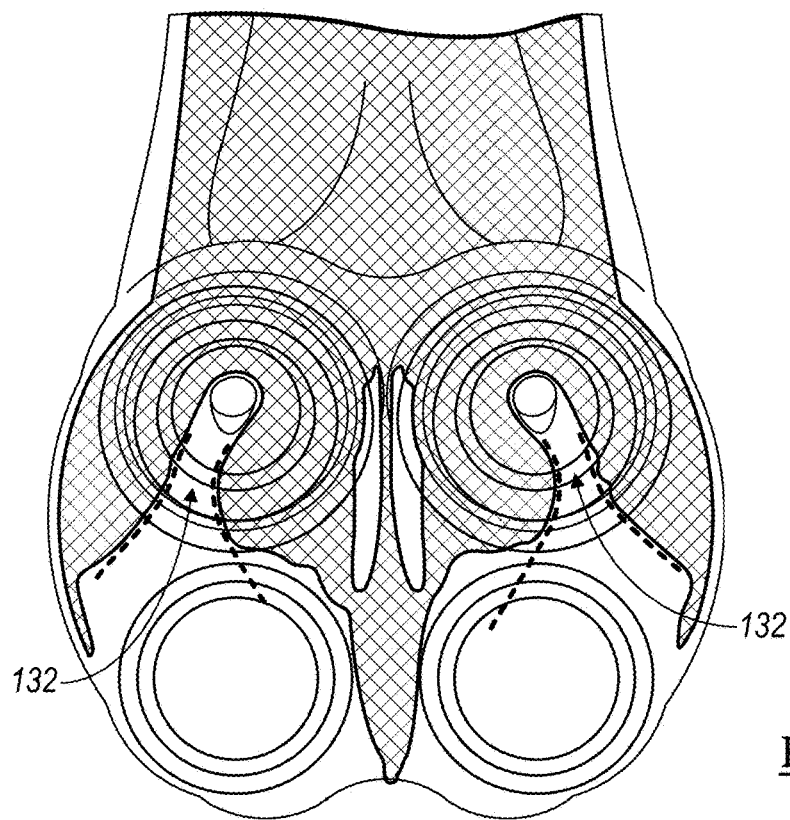
FIG. 8B illustrates modeling results showing constant total pressure from a computational fluid dynamic model of the intake port of the cylinder head of FIG. 2 taken from the deck face of the cylinder with the fairings removed.

FIG. 8A illustrates a schematic of modeling results showing constant total pressure from a computational fluid dynamic model of the intake port of the cylinder head of FIG. 2 taken from the deck face of the cylinder. FIG. 8B illustrates modeling results showing constant total pressure from a computational fluid dynamic model of the intake port of the cylinder head of FIG. 2 taken from the deck face of the cylinder with the fairings removed. As can be seen from a comparison between FIGS. 8A and 8B, the wake zone 130 downstream of the fairings 92 and valve guides in FIG. 8A is smaller than the wake zone 132 downstream of the valve guides in FIG. 8B where there are no fairings present.

Figure 8C:
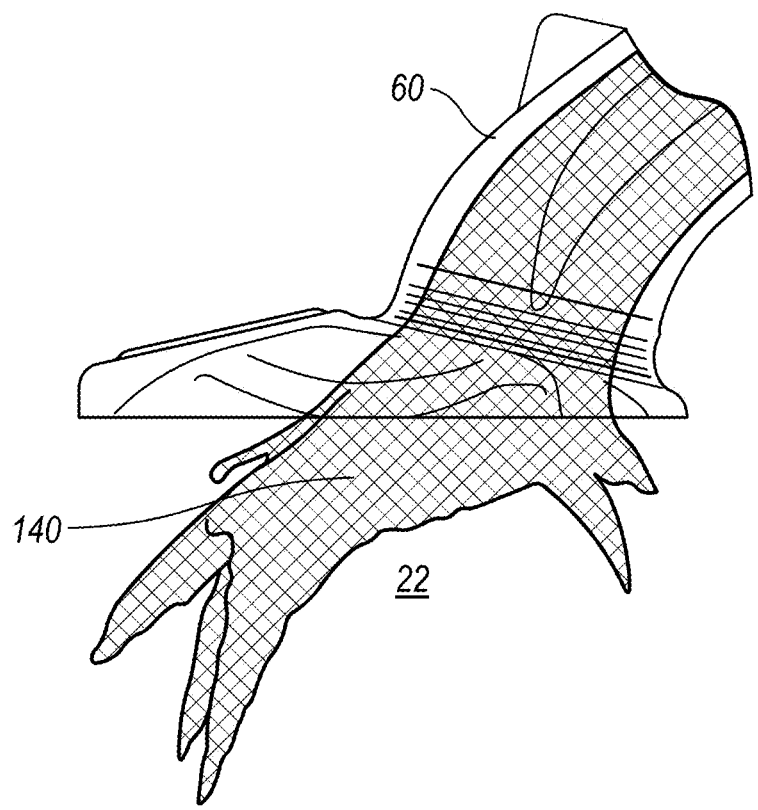
FIG. 8C illustrates modeling results showing constant total pressure from a computational fluid dynamic model of the intake port of the cylinder head of FIG. 2 taken as a side perspective view.
Figure 8D:
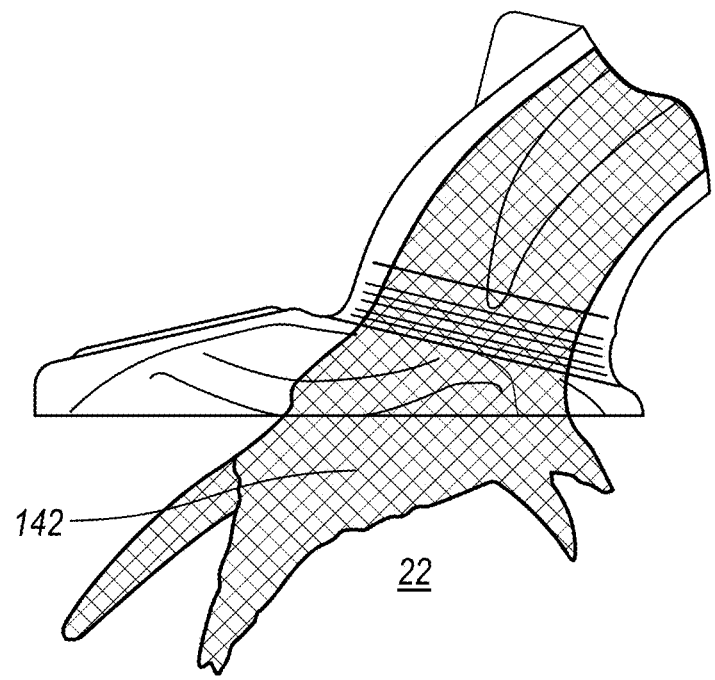
FIG. 8D illustrates modeling results showing constant total pressure from a computational fluid dynamic model of the intake port of the cylinder head of FIG. 2 taken as a side perspective view with the fairings removed.

FIG. 8C illustrates a schematic of modeling results showing constant total pressure from a computational fluid dynamic model of the intake port of the cylinder head of FIG. 2 taken from a side perspective view. FIG. 8D illustrates modeling results showing constant total pressure from a computational fluid dynamic model of the intake port of the cylinder head of FIG. 2 taken from the side perspective view with the fairings removed. As can be seen from a comparison between FIGS. 8C and 8D, the plume 140 of total pressure into the cylinder 22 when fairings are present in the intake port 60 is larger in FIG. 8C than the plume 142 of total pressure into the cylinder 22 without fairings in FIG. 8D.

Generally, the fairings 92 act to provide increase and direct flow of intake air through a specific port volume and allow tuning of intake air within the port, through the seat and into the cylinder, which thereby increases internal combustion engine efficiency and power density. The intake ports are a critical element for tuning the engine due to their restrictive geometry.

Figure 9:
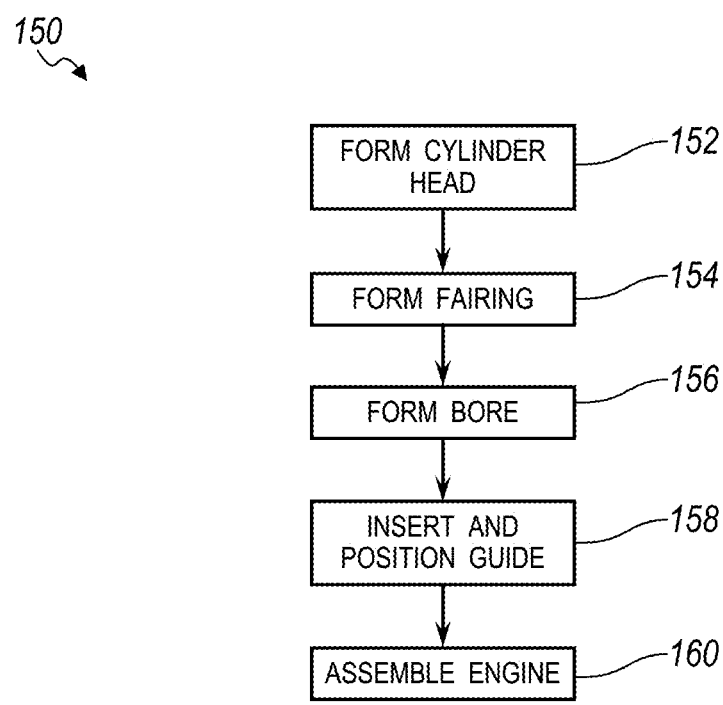
FIG. 9 illustrates a flow chart for a method of making the cylinder head of the engine of FIG. 2 according to an embodiment.

FIG. 9 illustrates a flow chart of a method 150 of forming a cylinder head and an engine according to various embodiments. In other embodiments, various steps in the method 150 may be combined, rearranged, or omitted.

A cylinder head is formed with a roof preform at step 152. The cylinder head may be formed using various processes, and in one example, is formed from aluminum using a casting process. The cylinder head may be formed using a lost core casting process or the like where various passages, such as intake port 60, are formed within the head. In one example, the head is formed with the general shape for the intake port, but with extra material in the roof section as a roof preform. In another example, the intake port is formed using a machining process such as a computer numerical control (CNC) milling process with the roof preform.

At step 154, the roof preform region is milled to form the fairings 92. The complex structure of the fairings 92 does not allow for the fairings to be formed from casting or molding at the time of forming the head. The fairings 92 and surrounding roof surface may be formed using a computer numerical control (CNC) milling process from the roof preform region. The roof preform is milled to form first and second asymmetric valve guide fairings that extend outwardly from a surrounding roof of the intake port. As shown above, each fairing has inner and outer side walls intersecting along an upstream edge and intersecting a downstream concave guide wall, with each fairing having a roof wall extending between the inner and outer side walls and the guide wall. If the intake port is CNC machined, the fairings 92 may be additionally CNC machined during the same machining process.

At step 156, the intake guide bore is also machined, for example, using a boring process. Other machining processes may additionally be performed on the head, including milling the deck face or various mounting flanges or surfaces, boring the exhaust valve guide bores, machining the intake and exhaust valve seats, and the like. The first and second valve guide bores are machined or bored into the roof of the intake port directly downstream of and to be concentric with respective guide walls of the first and second fairings.

At step 158, the first and second exhaust valve guides are positioned into the first and bores, respectively, with each guide extending to a plane containing the roof wall of an associated fairing.

At step 160, the head may be assembled with other components, including the remaining intake and exhaust valve components, a cylinder block, intake and exhaust manifolds, and the like to form an internal combustion engine.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine comprising:
a head defining an intake port with a roof defining first and second valve guide bores upstream of first and second siamesed intake valve seats for a cylinder; and
first and second fairings extending outwardly from the roof and positioned directly upstream of respective bores, each fairing with: an inner wall intersecting an outer wall along an upstream edge, a downstream guide wall intersecting the inner and outer walls and positioned upstream of the associated bore, and an inclined planar roof wall extending between the inner and outer walls and the guide wall, wherein the roof wall is inclined towards the associated inner wall of each respective fairing.

2. The engine of claim 1 wherein a length of the inner wall is less than a length of the outer wall for each fairing; and wherein each fairing is asymmetric.

3. The engine of claim 1 wherein the inner walls of the first and second fairings face one another.

4. The engine of claim 1 wherein, for each fairing, the inner wall is oriented at a first angle relative to the surrounding roof and the outer wall is oriented at a second angle relative to the surrounding roof, the first angle less than the second angle such that the inner wall is steeper than the outer wall.

5. The engine of claim 1 wherein the inner and outer walls of each fairing are planar, and an angle formed between the inner and outer walls of each fairing is an acute angle.

6. The engine of claim 1 wherein the roof wall is inclined towards the associated upstream edge of each respective fairing.

7. The engine of claim 1 wherein the roof wall is spaced apart from and nonintersecting with the surrounding roof of the intake port.

8. The engine of claim 1 wherein the guide wall is concave.

9. The engine of claim 1 wherein the roof wall is substantially triangular.

10. The engine of claim 1 wherein the guide wall of the fairing is concentric with a respective guide bore.

11. The engine of claim 1 wherein a distance between the inner and outer walls of each fairing at a downstream end of the fairing is less than a diameter of an associated guide bore.

12. The engine of claim 1 further comprising first and second valve guides positioned within the first and second valve guide bores, respectively;
wherein each valve guide extends into the intake port to a plane containing the associated roof wall.

13. The engine of claim 1 wherein the first and second fairings are mirror symmetric to one another with respect to a plane extending through a bridge between the siamesed ports and a mounting flange for an intake manifold.

14. The engine of claim 1 wherein each of the first and second fairings is integrally formed with the cylinder head.

15. The engine of claim 1 wherein the roof wall of each fairing is contained within a plane extending between the associated inner and outer walls.

16. A cylinder head comprising:
a member defining an intake port extending from an intake manifold mounting flange to first and second intake siamesed intake valve ports separated by a valve bridge, a roof of the intake port defining first and second v-shaped fairings upstream of and directly adjacent to first and second valve guide bores;
wherein each fairing has a planar inner wall and a planar outer wall extending outwardly from an adjacent surface of the roof, the inner and outer walls intersecting along an upstream edge of each fairing, a length of the outer wall being greater than a length of the inner wall for each fairing, the inner walls of the first and second fairings facing one another;
wherein each fairing has a downstream guide wall positioned upstream of the associated bore, extending outwardly from the adjacent roofsurface, and extending between and intersecting the inner and outer side walls, the guide wall shaped to be concentric with the associated bore;
wherein each fairing has a planar roof wall extending between the inner and outer side walls and the guide wall, each roof wall inclined towards the upstream edge of the associated fairing, and each roof wall inclined towards the inner wall of the associated fairing; and
wherein each fairing is asymmetric.

17. The head of claim 16 wherein the first and second fairings are mirror symmetric with respect to one another about a plane extending through the bridge and the mounting flange.

18. An engine comprising:
a head defining first and second fairings extending outwardly from a roof of an intake port for a cylinder, the first and second fairings positioned entirely upstream of first and second valve guide bores associated with first and second siamesed intake valve seats, each fairing having a roof wall contained within an inclined plane and extending between inner and outer walls, the inner and outer walls intersecting along an upstream edge;
wherein the roof wall of each respective fairing is inclined towards the associated upstream edge and towards the associated inner wall.

\* \* \* \* \*